(12) United States Patent
Calamvokis et al.

(10) Patent No.: US 6,856,622 B1
(45) Date of Patent: Feb. 15, 2005

(54) MULTICAST CELL SCHEDULING PROTOCOL

(75) Inventors: Costas Calamvokis, Mountain View, CA (US); Nicholas McKeown, Stanford, CA (US); Paul S. Ries, San Jose, CA (US)

(73) Assignee: PMC-Sierra, Inc., Burnaby (CA)

( * ) Notice: Subject to any disclaimer, the term of this patent is extended or adjusted under 35 U.S.C. 154(b) by 876 days.

(21) Appl. No.: 09/789,879

(22) Filed: Feb. 20, 2001

(51) Int. Cl.$^7$ ................................................ H04L 12/56
(52) U.S. Cl. ..................... 370/390; 370/395.4; 370/412
(58) Field of Search ................................. 370/390, 432, 370/395.1, 395.3, 395.4, 411–418, 447, 461, 462

(56) References Cited

U.S. PATENT DOCUMENTS

| | | | |
|---|---|---|---|
| 5,774,465 A | * | 6/1998 | Lau et al. ................. 370/395.3 |
| 5,903,564 A | * | 5/1999 | Ganmukhi et al. .......... 370/390 |
| 6,101,187 A | * | 8/2000 | Cukier et al. ............... 370/396 |
| 6,185,221 B1 | * | 2/2001 | Aybay ......................... 370/412 |
| 6,515,991 B1 | * | 2/2003 | McKeown ................... 370/390 |
| 6,661,788 B2 | * | 12/2003 | Angle et al. ................. 370/390 |
| 6,747,971 B1 | * | 6/2004 | Hughes et al. ............ 370/395.1 |

* cited by examiner

Primary Examiner—Steven Nguyen
(74) Attorney, Agent, or Firm—Townsend and Townsend and Crew LLP; Kenneth R. Allen (57) ABSTRACT

A method of facilitating the scheduling of a first multicast request signal of a series of multicast request signals is disclosed, wherein the first request signal is generated to enable the transmission of a multicast data cell by a source port processor to at least one destination port processor. In a preferred embodiment of the invention, the first request signal is received by a roster storage chip associated with a scheduler subsystem. The first request signal has associated therewith a multicast label of a first value and is adapted to schedule transmission of the first multicast cell to the at least one destination port processor at a first time. A roster of the at least one destination port processor to which the first multicast cell is destined is then generated. A dependence distance associated with the first request signal is determined. The dependence distance comprises the numerical value of the difference between a current multicast cell number (CMCN) and a previous multicast cell number (PMCN). The roster and the dependence distance are transmitted to one of the at least one scheduler chips, such transmission causing the roster and the dependence distance to occupy a second tail entry slot of a second circular buffer associated with the one of the at least one scheduler chips. The second tail entry slot has associated therewith a first multicast table index (MTI) comprising a numerical value. The scheduler chip further has associated therewith a head entry slot having associated therewith a second MTI comprising a numerical value. A first numerical parameter comprising the numerical sum of the dependence distance and the first MTI is determined. If the first numerical parameter is higher in value than the second MTI, the first request signal is arbitrated.

36 Claims, 8 Drawing Sheets

MULTICAST CELL SCHEDULING PROTOCOL

BACKGROUND OF THE INVENTION

1. Field of the Invention

The present invention relates generally to data handling systems and, more particularly, to a system for ensuring the efficient scheduling of data cell request signals that enable accurate and timely routing of data cell packets.

2. Description of the Background Art

There is increasing interest in providing communications between disparate computer systems and even between networks of differing characteristics. Further, with the availability of very high bandwidth trunk lines, e.g., using fiber optic cables, there is increasing interest in combining traffic from a great variety of sources for transmission through a single trunk line. For wide area networks, packet switching technology is widely used where information to be transmitted is broken into packets of data which are preceded by headers containing information useful in routing. The header may also identify the source and the destination. Whether truly packet switched or not, most digital communication systems employ message formats in which there is an identifying header of some sort.

As is well known, data network usage is expanding at a great rate both in terms of private networks and also public networks such as the Internet. While transmission link bandwidths keep improving, the technology of the systems which connect the links has lagged behind. In particular, routers are needed which can keep up with the higher transmission link bandwidths. A high speed router needs to achieve three goals. First, it needs to have enough internal bandwidth to move packets between its input and output interfaces at the desired rates. Second, it needs enough packet processing power at the interfaces to forward the packets and, third, the router needs to be able to redirect the packets between possible paths at the requisite rates.

Conventional routers are bus based, that is, a high speed bus is provided which can link a single input to a single output at one time. The router with which the present invention is associated utilizes a crossbar switch type interconnection scheme between inputs and outputs.

One problem which exists in the context of packet switching via a crossbar switch is the allocation of available paths through the crossbar. As is understood by those skilled in the art, for unicast traffic, only a limited number of switch points can be utilized at any one time since a single input should not be connected to more than one output at a given time and, likewise, each output should only be connected to a single input.

Allocation of the available paths through a crossbar switch is performed by a device called an arbiter. An arbiter is so named because it resolves (arbitrates) conflicting resource demands. Such arbiters are discussed, for example, in the publication "Symmetric Crossbar Arbiters for VLSI Communication Switches," by Yuval Tamir and Hsin-Chou Chi, *IEEE Transactions on Parallel and Distributed Systems*, Vol. 4, No. 1, 1993 [hereinafter "Tamir and Chi (1993)"], the disclosure of which is incorporated by reference.

In order to provide high efficiency and throughput, an arbiter has to operate at very high speed in determining which of competing possibilities will be accommodated. Further, in many circumstances, the arbiter is preferably fair in the sense it does not overly favor one source or destination over another or one form of data communication over another. Given that very disparate patterns can exist in data communication demands, particularly when accommodating data originating from disparate systems, the allocation problem is not a simple one.

Of particular concern for many router system designers are the difficulties encountered in the transmission of multicast data cells. Several factors make arbitrating paths for and delivery scheduling of multicast cells more complicated than for unicast cells and, if implemented poorly, prone to unacceptable system performance. First, multicast cells from one ingress linecard and of the same priority with a request label of particular identifying characteristic (i.e., the cells are said to be "in the same flow") typically share a queue with cells having differing labels, and can thus suffer from head-of-line blocking. Cells destined for a first set of outputs (as indicated by a "fanout" roster of outputs) can potentially block other cells destined for a second and differing set of outputs, even if the blocked cells' outputs are currently free. Second, cells with large fanouts may be substantially delayed before their destination outputs become free. While it is desirable to use the crossbar to copy cells, requiring that all such copies be delivered to their egress switch ports in the same time slot leads to unnecessary additional head-of-line blocking.

In order to alleviate these problems, many designers have implemented "fanout splitting" (also called "partial multicast") in which cells are copied to those portions of the fanout that are free, while the remaining copies remain queued until such time as the outputs to which they are destined are no longer busy. Studies have shown that this simple technique can significantly increase multicast cell delivery performance. With fanout splitting, if the scheduler can deliver cell copies to one or more outputs, it will do so. Finally, because a given input port can deliver at most one multicast cell into the crossbar at a time, it is desirable to maximize the amount of the fanout that is cleared in one time slot. This effort is made difficult in large switches by the necessity of distributing the scheduling of the fanout over multiple scheduler chips. On one hand, it is desired that the different schedulers communicate in an attempt to schedule each cell in the smallest number of passes. On the other hand, it is desired that scheduling be pipelined (i.e., continually performed in descending order of priority) to maximize the scheduling rate, which in turn makes communication between the chips difficult, particularly when the communication is in the opposite direction to pipeline propagation. It is therefore a further desirable objective to reconcile these two competing factors.

SUMMARY OF THE INVENTION

In accordance with the present invention, a method of facilitating the scheduling of a first multicast request signal of a series of multicast request signals is disclosed, wherein the first request signal is generated to enable the transmission of a multicast data cell by a source port processor to at least one destination port processor.

In a preferred embodiment of the invention, the first request signal is detained in a first queue associated with the source port processor. The first request signal is then transmitted to a first circular buffer associated with the source port processor, such transmission causing the first request signal to occupy a first tail entry slot of the first circular buffer. Subsequently, the first request signal and a first free signal are transmitted simultaneously to a roster storage chip associated with a scheduler subsystem. The first request signal has associated therewith a multicast label of a first value and is adapted to schedule transmission of the first multicast cell to the at least one destination port processor at a first time. The first free signal indicates the availability of the source port processor to transmit the first multicast cell at said first time and further indicates the availability of the source port processor to receive a second multicast cell at said first time.

A roster of the at least one destination port processor to which the first multicast cell is destined is then generated. A dependence distance associated with the first request signal is determined. The dependence distance comprises the numerical value of the difference between the current multicast cell number (CMCN) and the previous multicast cell number (PMCN). The CMCN comprises the numerical value returned by a counter responsive to the source port processor. The counter is incremented each time a request signal of the series of request signals carried by the source port processor is further transmitted by the roster storage chip to at least one scheduler chip associated with the scheduler subsystem. The PMCN comprises the CMCN value returned in the immediately previous instance in which a request signal of the series of request signals bearing a multicast label of the first value was received by the roster storage chip.

The first free signal, the roster and the dependence distance are transmitted to one of the at least one scheduler chips, such transmission causing the roster and the dependence distance to occupy a second tail entry slot of a second circular buffer associated with the one of the at least one scheduler chips. The second tail entry slot has associated therewith a first multicast table index (MTI) comprising a numerical value. The scheduler chip further has associated therewith a head entry slot having associated therewith a second MTI comprising a numerical value. A first numerical parameter comprising the numerical sum of the dependence distance and the first MTI is determined. If the first numerical parameter is higher in value than the second MTI, the first request signal is arbitrated.

DESCRIPTION OF THE SPECIFIC EMBODIMENTS

Figure 1:
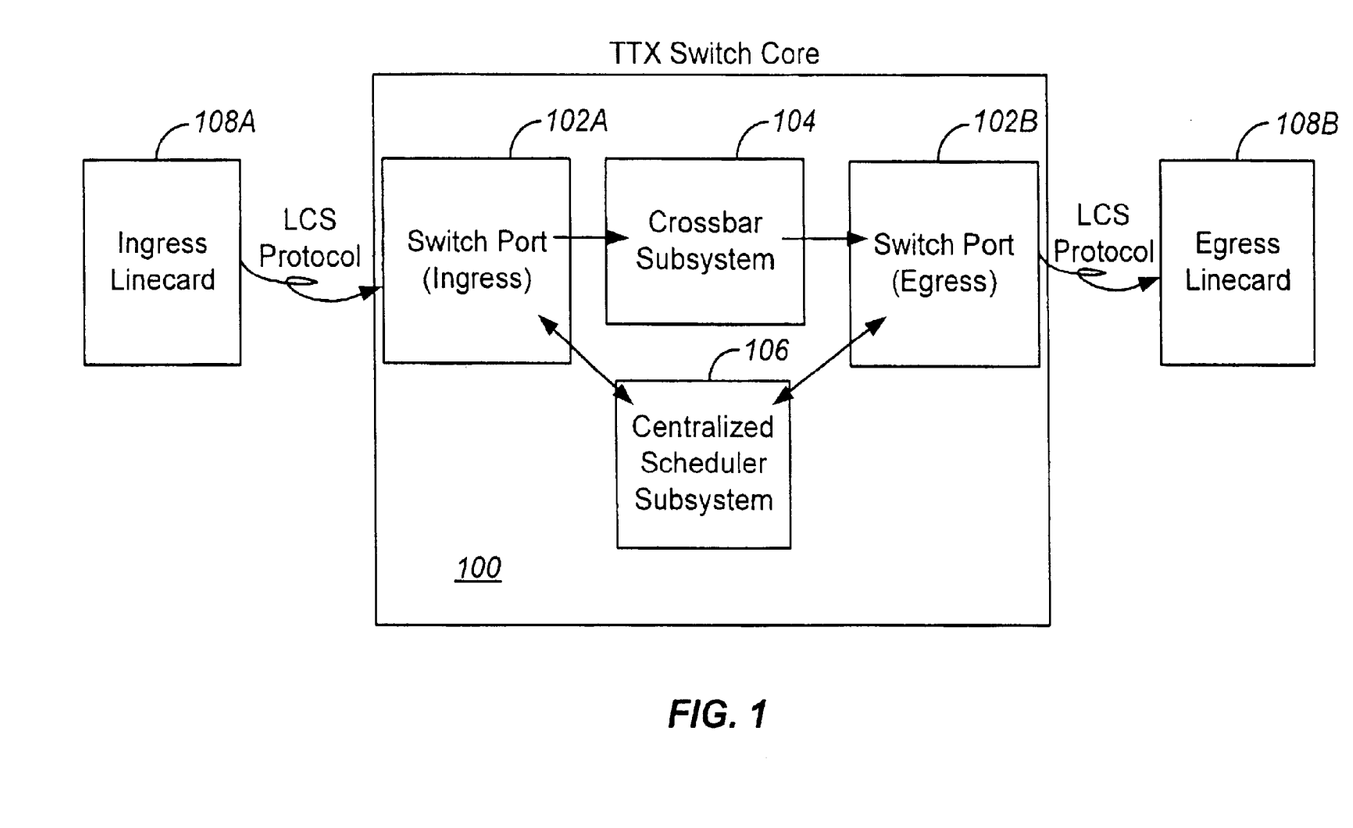
FIG. 1 is a block diagram depicting logical interconnects of a crossbar-based switch core in accordance with a preferred embodiment of the present invention.

FIG. 1 is a block diagram depicting logical interconnects of a base crossbar-based switch core 100 in accordance with the present invention. The switch core 100, for the purpose of describing the preferred embodiment, includes three types of devices: ports 102A, 102B, crossbar subsystem 104 and centralized scheduler subsystem 106.

Ingress port 102A and egress port 102B are respectively coupled to an ingress linecard 108A and egress linecard 108B, each of linecards 108A, 108B being outside the switch core 100. In a preferred embodiment, the ports 102 include shallow queues and implement a linecard-to-switch (LCS) protocol. Note that, with reference to FIG. 1, ports 102A, 102B are depicted as and may comprise separate instruments; in the preferred embodiment of the present invention, however, ports 102A, 102B comprise an integrated instrument.

The ports 102 may have shallow (e.g., 64 cell) queues in both ingress and egress directions. These queues may compensate for the latency between each linecard 108 and the core 100. In one perspective, such queues act as extensions of queues within the linecards.

A LCS protocol may provide an interface between linecards 108 and the switch core 100. In a preferred embodiment, the LCS protocol has per-queue, credit-based flow control which ensures that the queues are not overrun. A preferred embodiment for a LCS protocol is described in commonly-owned U.S. patent application Ser. No. 09/303,765, entitled "Packet Switch System," filed Apr. 29, 1999, with co-inventors Nicholas McKeown, Costas Calamvokis, Shang-Tse Chuang, and Steven Lin, the disclosure of which is incorporated by reference.

The ports 102 and scheduler 106 exchange information about cells that are waiting to be forwarded through the crossbar 104. A cell is a fixed-length packet. The scheduler 106 maintains local information pertaining to the number of cells that are waiting in all of the ingress queues of ports 102. In addition, the scheduler 106 instructs the ports 102 as to which cell they can forward through the crossbar 104 at each cell time (or interval).

Figure 2A:
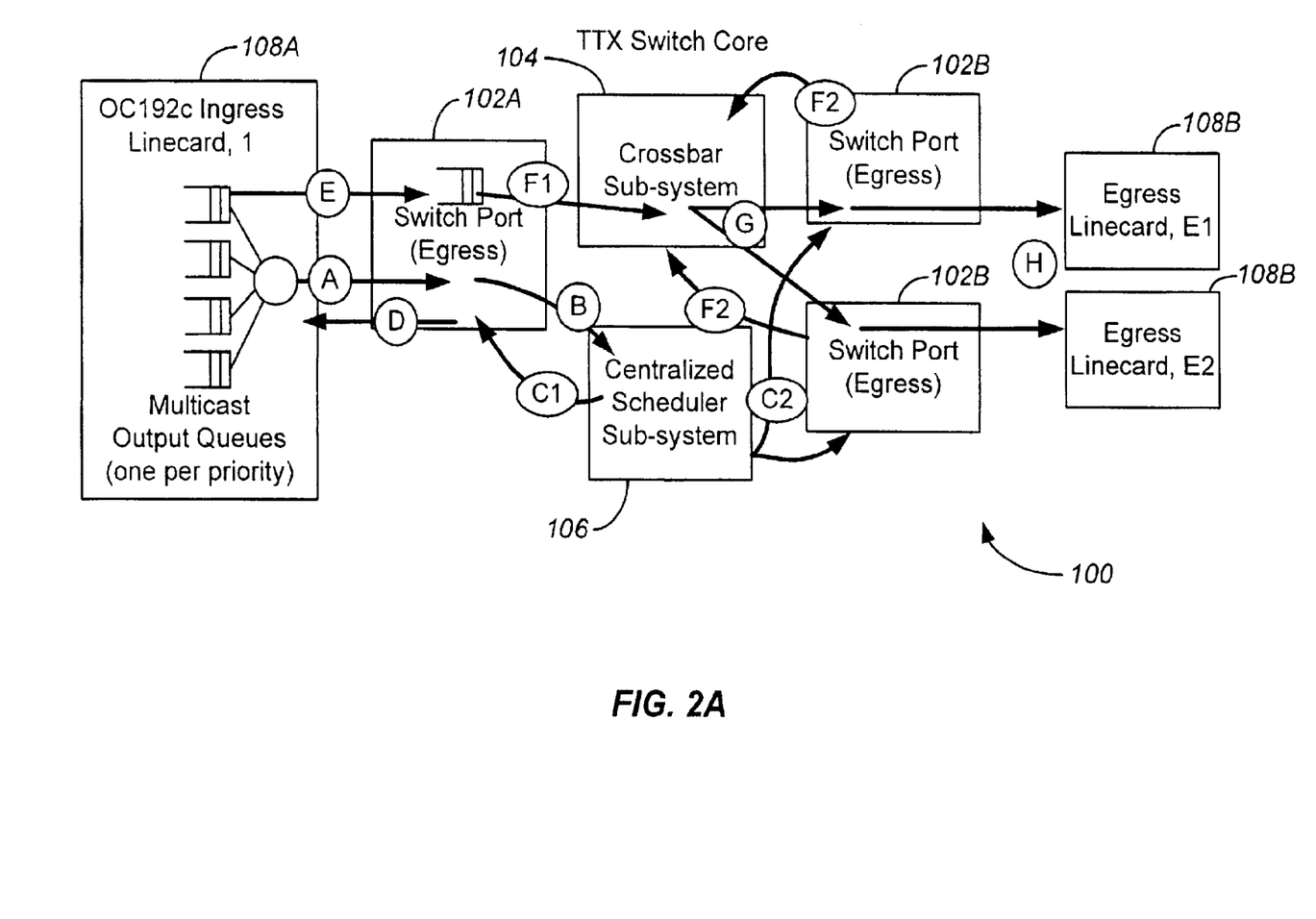
FIG. 2 depicts best-effort cell flow through the switch core of FIG. 1.

FIG. 2A shows a high-level view of how a multicast cell progresses through a switch core 100 in accordance with a preferred embodiment of the present invention. In this example, it is assumed that ingress linecard 108A holds a multicast cell to send to egress linecards 108B at priority 0. The sequence of events, as illustrated in FIG. 2A, is as follows:

(A) Ingress linecard 108A checks to see if it has sufficient multicast queue credits (pri=0) to send a request to switch core 100. When sufficient credits are available, linecard 108A sends a LCS Request with a label indicating that linecard 108A is to send a priority 0 multicast cell with label M.

(B) When ingress switch port 102A receives the LCS Request, it adds the request to a multicast FIFO for priority 0. Switch port 102A sends a request to scheduler subsystem 106 indicating that linecard 108A is to send a priority 0 multicast cell with label M.

(C) Some (possibly long) time later, scheduler subsystem 106 determines a non-conflicting configuration for crossbar 104 that includes the transfer of a priority 0 multicast cell from linecard 108A to egress linecards 108B. The configuration is for some time T in the future. Scheduler subsystem 106 sends a grant to the Switch Port indicating that the cell will be needed at time T (C1). The Scheduler Subsystem also sends reverse routing tags to all scheduled egress ports 102B (C2). If the grant (C1) exhausts the fanout for this request, scheduler subsystem 106 sends a dequeue indicator to ingress switch port 102A along with the grant.

(D) Because the cell is still on ingress linecard 108A, switch port 102A must send a LCS grant/credit signal to ingress linecard 108A requesting that it send the cell to reach switch port 102A by time T. The grant/credit signal carries with it a sequence number that is used by switch port 102A to align the incoming cell for transfer across crossbar 104 at the correct time.

(E) When ingress linecard 108A receives the LCS grant/credit signal, it transmits the LCS cell along with the sequence number sent by switch port 102A. When switch port 102A receives the cell, it places it in a delay-matching FIFO where it waits until time T.

(F) At time T, ingress switch port 102A transmits the cell (F1) into the crossbar subsystem 104 and the egress switch ports 102B transmit their reverse routing tags (F2) into crossbar subsystem 104.

(G) The cell passes through crossbar subsystem 104 with a fixed delay (i.e., although there are pipeline delays in crossbar 104, there are no variable queueing delays). A copy of the cell arrives at each egress switch port 102B that provided a reverse routing tag.

(H) Each egress switch port 102B immediately passes its cell copy to its corresponding egress linecard 108B with fixed delay.

Because scheduler subsystem 106 uses fanout-splitting to reduce head-of-line blocking, each time a scheduler chip (discussed below in further detail) of subsystem 106 schedules a portion of a cell's fanout, it needs to remember which other egress switch ports 102B await the cell. Furthermore, since switch core 100 only receives the cell from ingress linecard 108A once, the cell payload must be stored in case a portion of the fanout remains to be served.

Figure 2B:
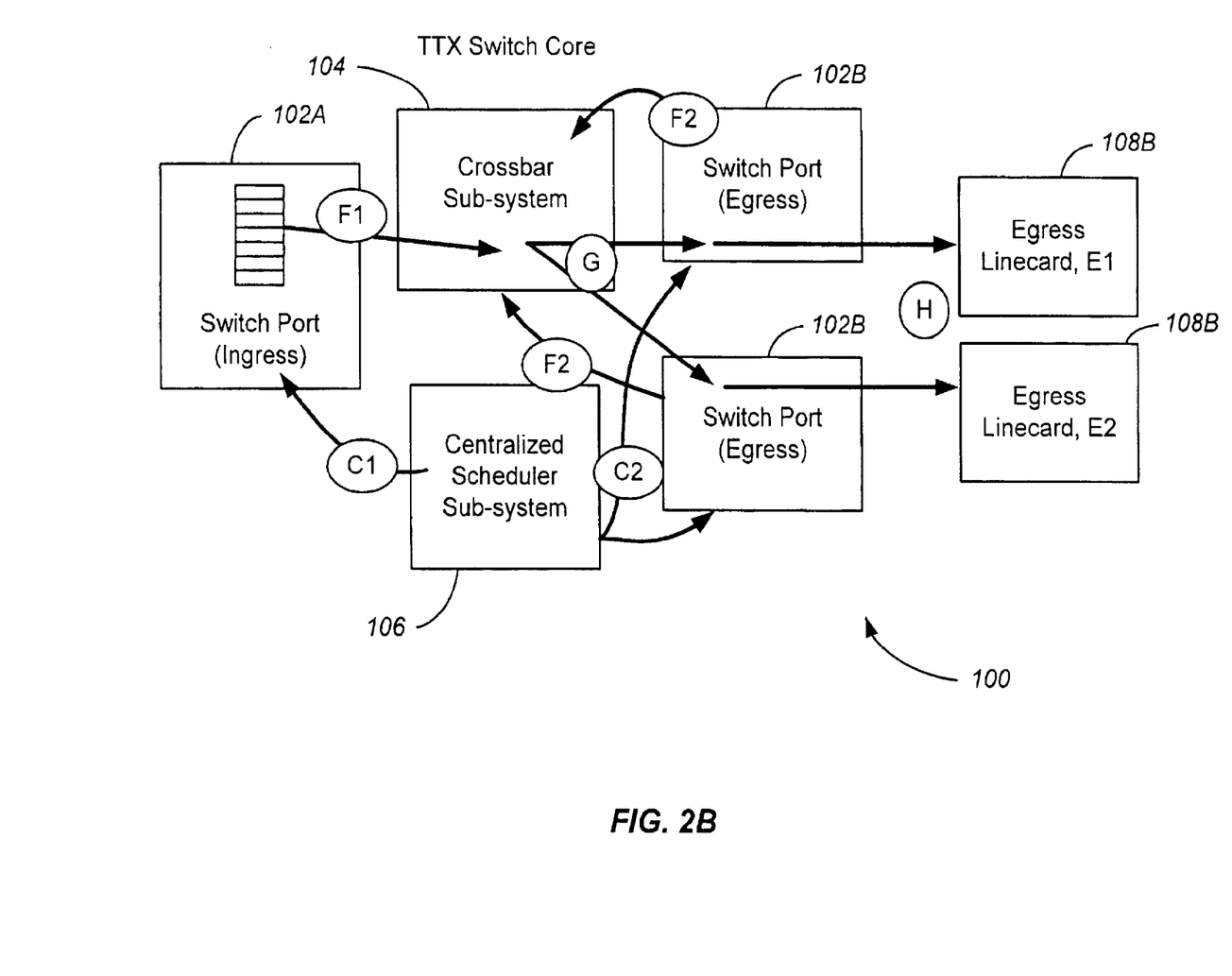

FIG. 2B shows an example of a multicast cell that has already been transferred from ingress linecard 108A, which has received an additional grant. The sequence of events for the second and subsequent grants, as illustrated in FIG. 2B, is as follows:

(C) Scheduler subsystem 106 determines a non-conflicting configuration for crossbar 104 that includes the transfer of a priority 0 multicast cell from ingress linecard 108A (not shown in FIG. 2B) to egress linecards 108B. This particular cell payload has traveled through crossbar 104 once before, but such previous travel only satisfied a portion of the complete fanout for the cell. The newly-scheduled configuration is for some time T in the future. Scheduler subsystem 106 sends a grant to switch port 102A indicating that the cell will be needed at time T (C1). Scheduler subsystem 106 also sends reverse routing tags to all scheduled egress ports 102B (C2). If the grant (C1) exhausts the fanout for this request, scheduler subsystem 106 also sends a message to ingress switch port 102A indicating that the cell no longer needs to be stored.

(F) At time T, ingress switch port 102A transmits the previously granted cell which is already stored in port 102A into crossbar subsystem 104 (F1), and egress switch ports 102B transmit their reverse routing tags into crossbar subsystem 104 (B2).

(G) The cell passes through crossbar subsystem 104 with a fixed delay (i.e., although there are pipeline delays in crossbar 104, there are no variable queueing delays).

(H) Each egress switch port 102B passes its cell copy to its corresponding egress linecard 108B with fixed delay.

Note that for both of these examples, the fanout for time T is arbitrarily chosen to be two. Of course, the first time a cell is granted it could have between 1 and N outputs, where N is the number of switch ports. Later grants may be for between 1 and (number of outputs previously granted) outputs.

Figure 3:
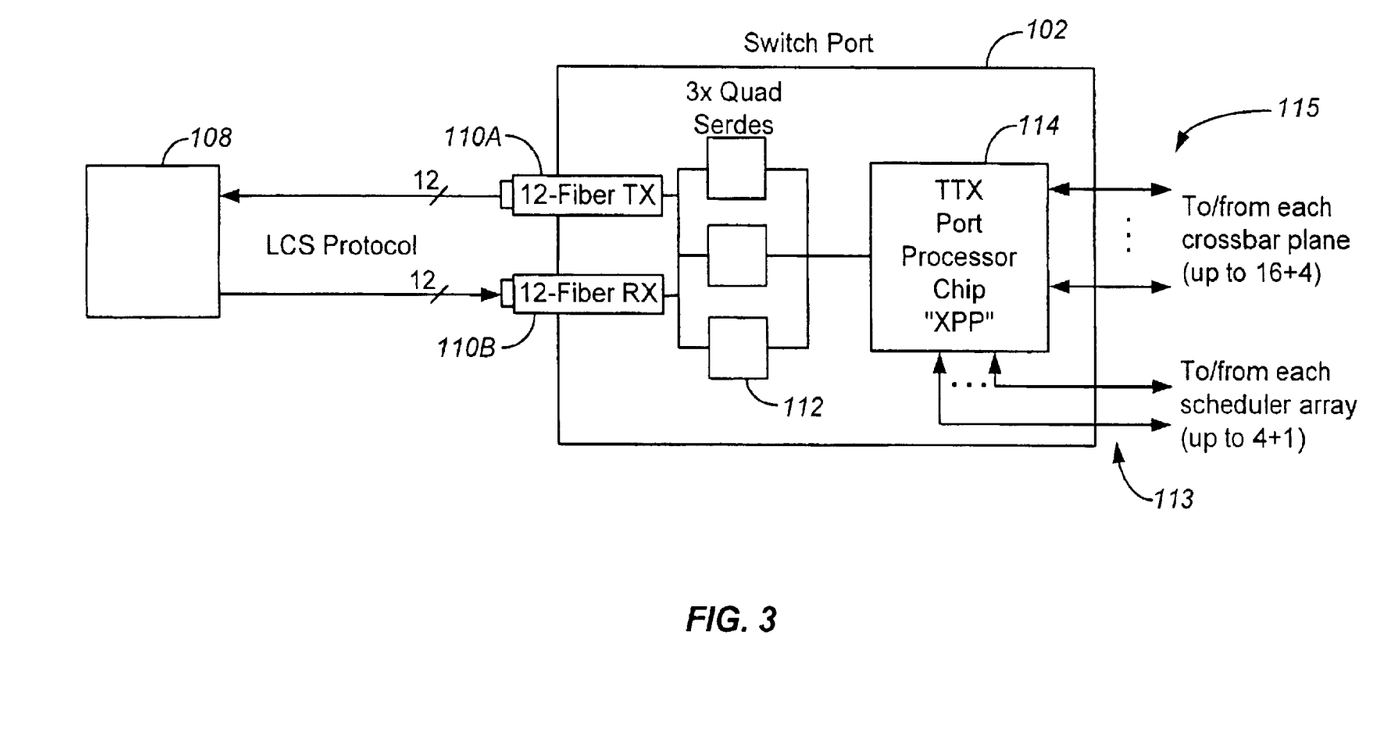
FIG. 3 is a schematic depiction of a switch port associated with the switch core of FIG. 1.

As illustrated in FIG. 3, switch ports 102, as contemplated by a preferred embodiment of the present invention, incorporate three main types of component on the data path: (1) 12-channel fiber-optic components 110A, 110B that transmit data to and receive data from linecard 108; (2) "serdes" (serializer-deserializer) devices 112 that convert each serial LVDS data-stream to and from a parallel bus; and (3) a port processor chip (X-PP) 114 that terminates the LCS protocol at switch core 100 and interacts with both scheduler 106 and crossbar 104 subsystems via two-way crossbar I/Os 115 and two-way scheduler I/Os 117.

Port processor chip 114 maintains LCS request counters for each egress switch port 102B. When scheduler subsystem 106 is able to receive new requests, port processor chip 114 selects which of the requests to send. Port processor chip 114 also processes LCS request update control messages from linecard 108.

Another function of port processor chip 114 is to send LCS grant/credit signals to its associated linecard 108, and receive LCS cells from linecard 108. When port processor chip 114 receives a grant signal from scheduler subsystem 106, it sends a LCS grant/credit signal to linecard 108. When linecard 108 replies by sending in a cell from the granted queue, port processor chip 114 stores the cell until the cell is to be sent to crossbar subsystem 104.

Still another function of port processor chip 114 is to forward cells over crossbar subsystem 104. Crossbar subsystem 104 consists of 16 identical planes. When the cell's time for transfer has arrived, port processor chip 114 delivers the cell (along with a reverse routing tag) to one plane of crossbar subsystem 104. A cell is sent to just one crossbar plane as 16 "portions" over 16 consecutive cell times.

Still another function of port processor chip 114 is to receive cells from crossbar subsystem 104. Port processor chip 114 receives cells as a series of portions from each of 16 crossbar planes. Each plane delivers a complete cell to port processor chip 114 every 16 time slots. Port processor chip 114 then immediately sends the cell toward linecard 108.

As will be further discussed below, still another function of port processor chip 114 is to interact with each plane of scheduler subsystem 106. Scheduler subsystem 106 consists of between one and four separate planes—one plane per best-effort priority class. Port processor chip 114 interacts with each scheduler plane in a number of ways: first, port processor chip 114 sends requests to the scheduler plane corresponding to the priority of the request. Priority 0 requests are sent to the first plane, priority 1 to the second plane, and so on. Secondly, port processor chip 114 receives grant signals from each plane indicating that port processor chip 114 should send a LCS grant/credit signal to linecard 108. Thirdly, port processor chip 114 passes the decisions from one scheduler plane to the next. For example, when the first scheduler plane has made decisions for priority "0," port processor chip 114 passes on the decisions (that affect switch port 102 corresponding to port processor chip 114) to the scheduler plane handling decisions for the second priority. Port processor chip 114 likewise functions until all of the priorities have been scheduled. Fourthly, port processor chip 114 receives reverse-routing tags from each scheduler plane so that the routing tag can be sent into crossbar subsystem 104 at the appropriate time.

For purposes of the ensuing discussion, the terms "input X-PP" or "ingress X-PP" shall be used for an X-PP associated with a corresponding ingress switch port 102A, which transmits cells and cell requests originating with a corresponding ingress linecard 108A. In similar manner, the terms "output X-PP" or "egress X-PP" shall be used for an X-PP associated with a corresponding egress switch port 102B receiving transmits cells on behalf of a corresponding egress linecard 108B.

Figure 4:
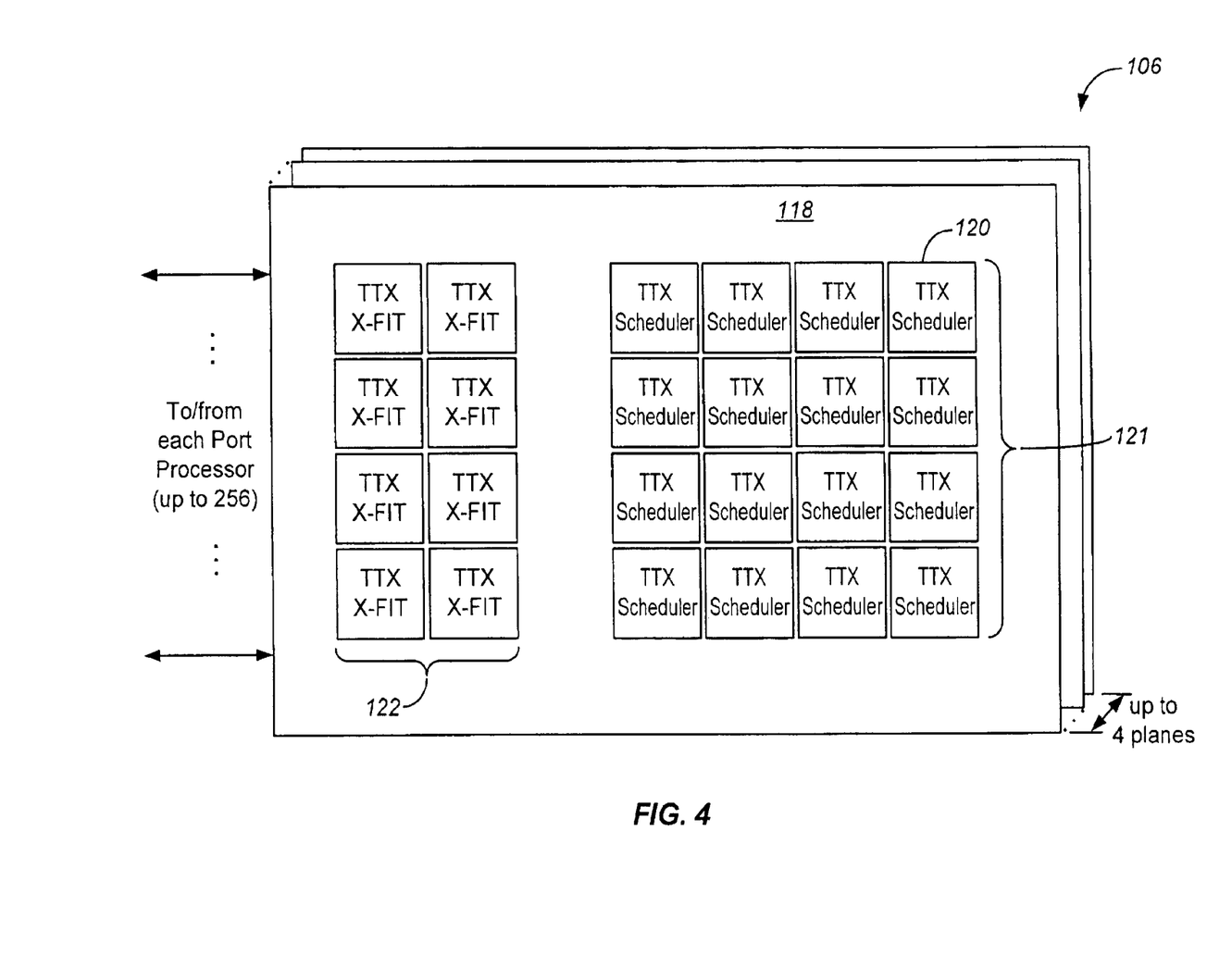
FIG. 4 is a schematic depiction of a scheduler subsystem associated with the switch core of FIG. 1.

As illustrated in FIG. 4 and discussed above, scheduler subsystem 106 comprises up to four separate priority planes 118. Scheduler subsystem 106 may, alternatively, comprise more than four priority planes as requirements demand. Each priority plane 118 contains an array 121 of scheduler chips (X-SCH) 120 that together form a single-priority scheduler. Each priority plane 118 further comprises a set of fanout roster storage chips (X-FIT) 122 that store a multicast fanout table (not shown) and, by referring to this fanout table, select multicast fanouts based on multicast labels associated with LCS requests. FIG. 4 further illustrates the arrangement of X-SCH and X-FIT chips 122 needed to build a four priority 256×256 scheduler with a fifth redundant plane.

In accordance with the present invention, X-FIT chip 122 does not perform multicast arbitration. Instead, X-FIT chip 122 stores the multicast fanouts and then delivers them to the appropriate X-SCH chip 120, as will be discussed in detail below. The X-SCH chip 120 is then responsible for scheduling both unicast and multicast traffic.

Scheduler chips 120 operate largely independently of each other. However, the schedulers 120 do not operate completely independently: for example, grant information is passed among the scheduler chips 120 in a pipelined manner to ensure that each input port 102A is only scheduled once per time slot. Furthermore, scheduler chips 120 are allowed to schedule cells in non-FIFO order as long as cells belonging to the same flow do not become mis-sequenced at any output port 102B.

Figure 5:
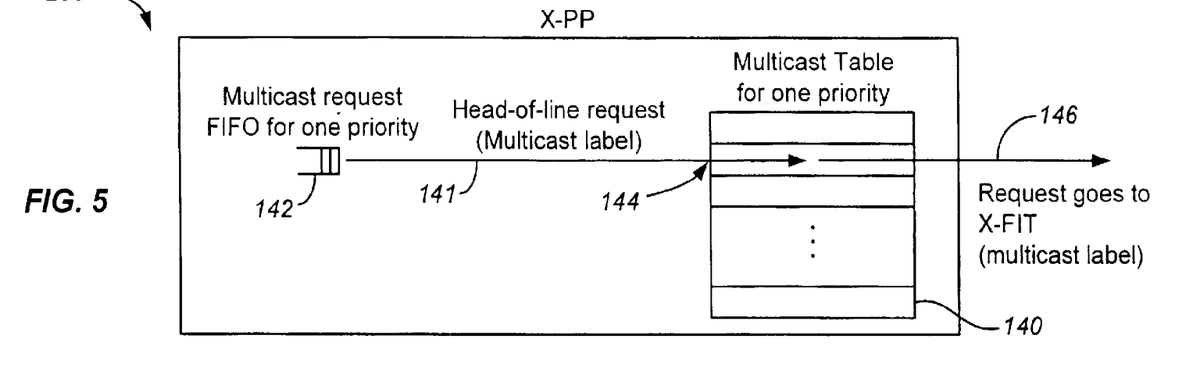
FIG. 5 is a schematic depiction of a port processor associated with the switch port of FIG. 3.

A critical component in preserving cell sequence integrity is a table maintained by each X-PP 114 and referred to as a Multicast Table (MT) 140, along with a distributed protocol between the schedulers 120. Each MT 140 manages a window of multicast requests that are visible at any given time to the X-SCH chips 120 in a scheduler priority array 121 (preferably, the window size is 96 and is determined by the latency of a single scheduler priority array). Further, MT 140, being arranged as a table indexed by a common numerical Multicast Table Index (MTI), gives an X-PP 114 and array 121 of X-SCH chips 120 a commonly understood identifying nomenclature with respect to a particular ingress cell. As shown in FIG. 5, an exemplary X-PP 200 of a set of X-PPs 114 maintains at least one MT 140 that queues, among other items, multicast requests received from an ingress linecard 108A. MT 140 may also queue multicast cells that have been granted ingress to port 102A from linecard 108A but, because of fanout-splitting, must traverse crossbar 104 again in order to arrive at each and every egress port 102B for which the cell was originally intended. Multicast requests arriving at X-PP 200 from the ingress linecard 108A wait in a FIFO queue 142 associated with X-PP 200 until there is space in the corresponding MT 140. Each MT 140 acts as both a table and a circular FIFO buffer. At step 141, new request entries are added to the tail slot 144 of MT 140, but entries can be read from any slot location in MT 140. Each entry of MT 140 has associated therewith a corresponding and unique MTI. When space is to be made available in MT 140, an entry for a new request is created in MT 140 and, at step 146, an older request is sent to the appropriate scheduler priority plane 118.

For a given scheduler priority plane 118, X-PP 200 begins arbitration for a future time T by sending into the appropriate plane 118 a new request along with the appropriate "free information." Input free information indicates to scheduler 106 whether the path of X-PP 200 into crossbar 104 is available or has already been reserved for T, while output free information tells scheduler 106 whether the path from crossbar 104 into X-PP 200 has been reserved for T. Free information is the product of previous scheduling passes for T (either TDM or some higher-priority best-effort class).

Figure 6:
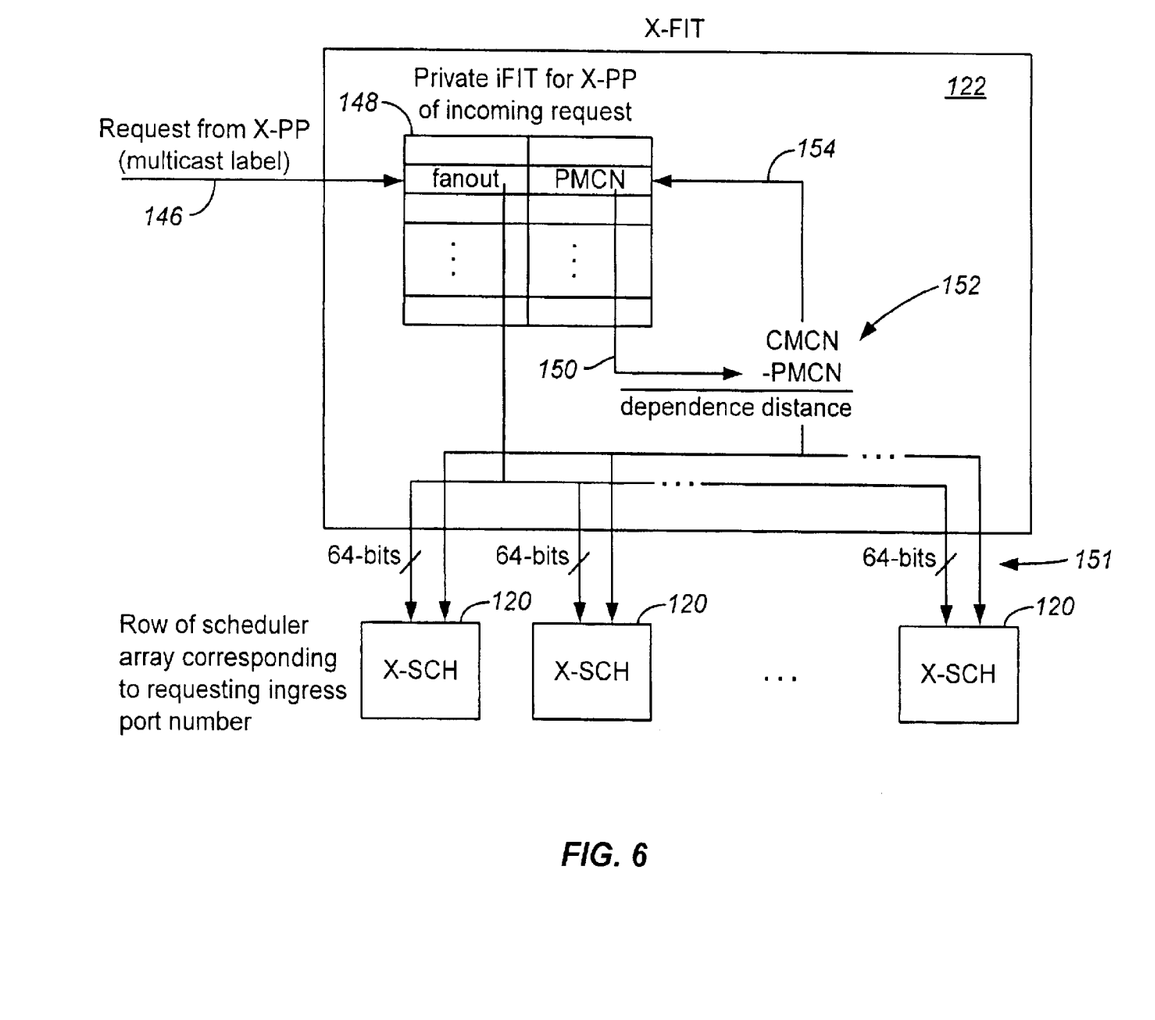
FIG. 6 is a schematic depiction of a fanout roster storage chip associated with the scheduler subsystem of FIG. 4.

As illustrated in FIG. 6, when a multicast request leaves X-PP 200 and enters plane 118, the request arrives at an X-FIT chip 122. Preferably, each X-PP 114 is connected to one X-FIT chip 122 for each priority. Switch core 100 employs a table called the Input Fanout Information Table (iFIT) 148 to look up a multicast label associated with a LCS request and select a fanout (a bitmap of ports that cells using that label should be sent to) corresponding to the label. Before sending a multicast request and label, the iFIT must be programmed by a CPU (not shown) with a fanout corresponding to each label. An X-FIT chip 122 contains the complete iFIT table for a subset of ingress X-PPs 114. X-FIT chips 122 are connected to each of the X-SCH chips 120 in one row of priority array 121. Recall that array 121 is organized into rows (representing input X-PPs) and columns (representing output X-PPs). The fact that an X-FIT chip 122 connects to every scheduler chip 120 in a row means that X-FIT chip 122 communicates request information to all output X-PPs 114 on behalf of input X-PP 200. This arrangement enables the X-FIT chip 122 to distribute to array 121 the entire fanout information for a multicast request. Although a particular X-FIT chip 122 handles requests for several ingress X-PPs 114 simultaneously, it is logically equivalent to think of each ingress X-PP as being served by a private X-FIT chip 122. Thus, the ensuing discussion focuses only on the single ingress X-PP 200 transmitting an exemplary multicast request, as shown in FIGS. 5 and 6.

The input/output free information and multicast request passed from X-PP 200 arrives at X-FIT chip 122. X-FIT chip 122 does not process the free information; it merely passes it on unmodified to the appropriate X-SCH chip 120 lying on the leading diagonal of array 121.

X-FIT chip 122 uses the identifying number of ingress X-PP 200 (which X-FIT chip 122 determines based on the ingress serial link over which the request arrived) and multicast label (transmitted by ingress X-PP 200 with the request) to index into the iFIT 148 and look up a fanout entry. Each entry of iFIT 148 contains a bitmap representing the fanout denoting output X-PPs 114. The fanout specifies which of the output X-PPs 114 are to receive a copy of the requested cell.

Indexing into iFIT 148 also returns, at step 150, the Previous Multicast Cell Number (PMCN); a value that is used to prevent cells within a flow (i.e., having identical labels) from being scheduled out of sequence. The PMCN is considered in conjunction with the Current Multicast Cell Number (CMCN). The CMCN comprises the numerical value returned by a counter responsive to ingress X-PP 200. This counter is incremented each time a request issued by ingress X-PP 200 is further transmitted by X-FIT chip 122 into array 121. The PMCN saved in the iFIT 148 reflects the value of the CMCN returned in the immediately previous instance in which a request in the same flow as that of the current request was received by X-FIT chip 122. In essence, each time a new request arrives, X-FIT chip 122 compares the PMCN for the request's flow with the CMCN to see how long it has been since a cell belonging to the same flow was requested.

The difference between CMCN and PMCN (i.e., CMCN−PMCN) shall be referred to hereinafter as the dependence distance ("DD") and is calculated at step 152. If it has been a long time (i.e. if DD is sufficiently large), then the previous cell in the instant flow has long since been granted to, and, as such, there is no possibility of the new request overtaking the previous request. If, however, DD is small, then the request associated with the previous cell in the instant flow may still reside in the scheduler array 121 and a risk exists of the new request overtaking the old request. The CMCN and PMCN are represented by fixed width binary numbers. Thus, there is a maximum value (M) that either can store. When the CMCN is M and is incremented, the CMCN wraps around to zero. Thus, it is possible at any given time that the CMCN is smaller than the PMCN and, as a result, the DD (CMCN−PMCN) is negative in value. In this case M+1 is added to the existing DD to create a DD of positive value (and so to reflect the correct distance between the CMCN and PMCN after a wrap has occurred). Note that it is possible that the CMCN has wrapped multiple times since a particular PMCN was last accessed. Such a scenario does not result in cells being misordered because the result of the calculation errs on the safe side, indicating a dependence where none in fact exists.

The multicast requests are stored in a queue of each X-SCH chip 120. If DD is larger than the total number of requests currently in the queue of each chip 120, then the previous request in the flow has been scheduled, and there are no "flow dependencies" for the current request. Further, if the value DD is greater than the upper bound of the size of the request window (i.e., the size of the Multicast Table) within X-PP 200, then the previous request in the flow has already been scheduled and, as such, there is no dependence.

Although X-FIT 122 calculates the value DD, X-FIT 122 does not act upon such calculation. X-FIT 122 simply passes the value DD into the scheduler array 121 where, as discussed below in further detail, the DD value is used by the X-SCH chips 120 to prevent cells within a flow from being mis-sequenced.

Once X-FIT 122 completes the DD calculation, the CMCN, at step 154, is stored in the iFIT 148 as the new PMCN entry for the flow (so that the next request to come along in the current flow is made dependent on the current request). The CMCN of the port 102A within which X-PP 200 is disposed is incremented after each incoming multicast request from X-PP 200.

Figure 7:
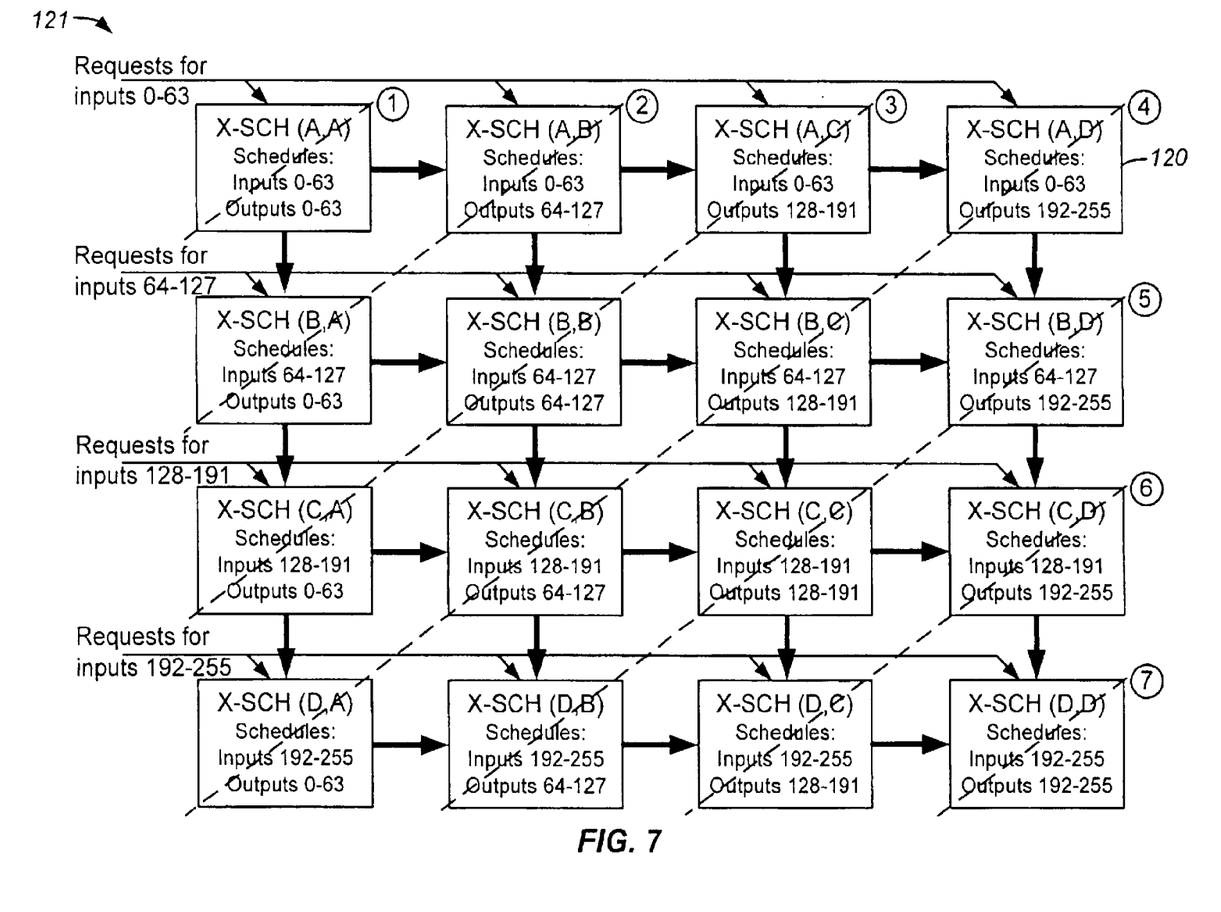
FIG. 7 is a schematic depiction of an array of scheduler chips associated with the scheduler subsystem of FIG. 4.

Before discussing the manner in which arbitration of multicast cells is performed by array 121, it is useful to examine the general manner in which array 121 performs arbitration of unicast cells. FIG. 7 illustrates the array 121 of X-SCH chips 120 that is used to arbitrate for one priority in a 256×256 switch and the logical flow of scheduling decisions made within each plane 118. The operation is based on a wave-front arbiter algorithm, the preferred embodiment of which is described in commonly-owned U.S. patent application Ser. No. 09/549,878, entitled "Short and Long Term Fair Shuffling for Crossbar Switch Arbiter," filed Apr. 17, 2000, with inventor Costas Calamvokis, the disclosure of which is incorporated by reference. Internally, each X-SCH chip 120 operates as a 64×64 wave-front arbiter and always schedules a specific set of input and output X-PPs (for both unicast and multicast cells). For example in FIG. 7, the scheduler chip in the top left hand corner of the array [X-SCH (A,A)] always makes scheduling decisions on behalf of input X-PPs numbered 0–63 and output X-PPs numbered 0–63. When arranged as an array, the scheduler chips cover (or "tile") the complete set of input and output X-PPs.

In addition to the wave-front arbitration that takes place within each X-SCH chip 120, another wave-front arbitration takes place between X-SCH chips 120. A wave-front progresses across the array 121 of chips 120 as shown by the seven diagonal dotted lines in FIG. 7. First, in stage 1, X-SCH (A,A) makes its decision on behalf of its input and output X-PPs. In stage 2, schedulers X-SCH (A,B) and X-SCH (B,A) make their arbitration decisions in parallel as they are working on independent sets of input and output X-PPs. As each scheduler 120 completes its arbitration, it passes on its decision downstream to the schedulers 120 in its row (i.e. the X-SCH chips that also schedule the same input X-PPs) and downstream to the schedulers 120 in its column (i.e. the X-SCH chips that also schedule the same output X-PPs). As the wave progresses, the decisions are passed downstream to each chip 120 in turn, which arbitrates and passes on its decision downstream to the next chip 120 in its row and column. The progression of the information about each successive scheduling decision is shown by the thick shaded arrows in FIG. 7.

In operation, the scheduler array 121 actually works slightly differently in two important respects from the way shown. First, the arbitration uses a wrapped wave to reduce the number of stages (and hence reduce the time taken to complete a decision), in the present example, from seven to four. In wrapped wave front arbitration, the schedulers 120 in diagonals #1 and #5 can make their decisions at the same time, followed by diagonals #2 and #6, #3 and #7, then finally diagonal #4. For an array 121 with $N^2$ scheduler chips 120, using a wrapped wave front reduces the number of stages from 2N−1 to N.

The second way in which operation of array 121 differs from the example of FIG. 7 is the starting point of the array 121 for each scheduling decision. If the arbitration always started with diagonals #1 and #5 then X-SCH (A,A) would always make its decisions before, say, X-SCH (A,B), and so connections between input X-PPs numbered 0–63 and output X-PPs numbered 0–63 would receive strict preference over all other connections sharing the same input or output X-PPs. In the extreme case, input X-PPs numbered 0–63 could dominate the opportunities to transmit to output X-PPs numbered 0–63, permanently depriving other input X-PPs of the ability to send to these output X-PPs. Likewise, input X-PPs numbered 0–63 may be prevented from sending to any other output X-PPs. Within each X-SCH chip 120, this problem is solved using shufflers that change the order of preference between inputs and outputs in each successive cell time. The shuffling sequence is carefully picked to provide short and long-term fairness among connections. The shuffling mechanism within each X-SCH chip 120 will operate in accordance with that described in the above-referenced U.S. patent application Ser. No. 09/549,878. Between each X-SCH chip 120, arbitration periodically starts at a different diagonal. The time at which the starting diagonal changes is programmed by the user, but is expected to typically be every few hundred time slots. At each change, the starting point progresses from one diagonal to the next. For example, if initially the arbitration sequence of the diagonals is: (#1 and #5, #2 and #6, #3 and #7, #4), then after the first change in starting point, the sequence becomes: (#2 and #6, #3 and #7, #4, #1 and #5). In this way, each X-SCH chip 120 has preference for an equal amount of time over the other schedulers that share its input and output X-PPs.

Figure 8:
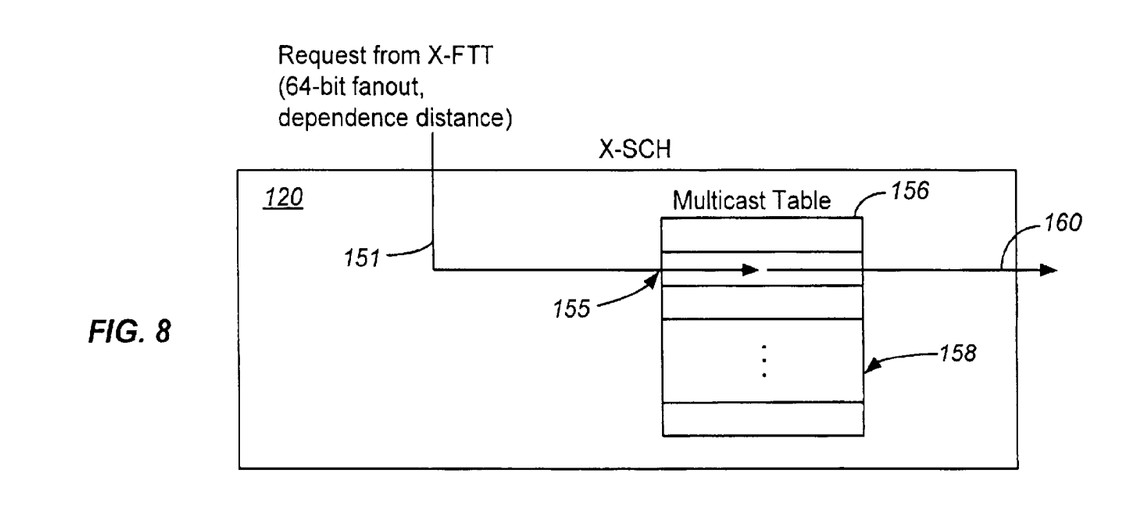
FIG. 8 is a schematic depiction of a scheduler chip of FIG. 7.

As shown in FIG. 6, once the X-FIT 122 has retrieved the fanout and calculated DD, X-FIT 122, at step 151, communicates this information to each X-SCH chip 120 within a row. As best illustrated in FIG. 8, each X-SCH chip 120 receives 64 bits of fanout information; the left-most chip 120 in the row gets fanout information for output X-PPs 114 numbered 0–63, the adjacent scheduler gets fanout information for output X-PPs 114 numbered 64–127, and so on. Note that even if the fanout portion for a particular scheduler chip 120 is completely empty, chip 120 will nonetheless receive such fanout portion. This unqualified receipt of a fanout portion by chip 120 is necessary to enable each of the X-SCH chips 120 in the array 121 to keep track of every request and to remain in sync with each other. For performance reasons, the scheduler chips 120 need to receive the fanout information for a particular request while arbitrating for the same future frame time (the X-FIT 122 actually sends the fanouts together, and the schedulers themselves delay the information internally). For example, if a X-SCH chip S arbitrates for future frame time T at real frame time R and X-SCH chip S' arbitrates for future frame time T and real frame time R+5, then it is desirable for the request information to reach S at time R and S' at time R+5. Failure to synchronize delivery of the requests in this manner will, in the event that the cell can be scheduled immediately, result in S and S' unnecessarily reserving the crossbar 104 for different future frame times to transmit the same cell. Since the path between X-PP 200 and crossbar 104 can transmit only one cell per frame time, such a failure to synchronize further results in inefficient use of bandwidth (i.e., some lower priority could have used the frame time wasted on the duplicated input).

As further shown in FIG. 8, when a X-SCH 120 chip receives a multicast request, the request is added to the tail entry slot 155 of a FIFO MT circular buffer 156, along with the value DD computed by X-FIT 122. One could alternatively think of MT 156 as a multicast request FIFO buffer although, as discussed below in further detail, MT 156 does not strictly adhere to a FIFO approach. Each entry of MT 156 as associated therewith an MTI matching that of MT 140 for each individual request. It is important that X-PP 200, X-FIT 122 and each scheduler chip 120 within a row have the same understanding of the MTI nomenclature corresponding to a particular cell, and that they remain in lock-step with each other by tracking entries that are added to and freed from the MT 156.

In addition to the request, each X-SCH chip 120 on the leading diagonal of the priority array 121 receives free information from ingress port 102A. This free information is unrelated to any request received in the same time slot. This is because the input free information is for a specific future frame time T, and needs to be passed along the row to the scheduler chip 120 that begins the arbitration for T. The output information is also for T, and so must be passed within the column to the scheduler chip 120 that begins the arbitration for T.

Each real frame time R, one of the (wrapped) diagonals in the scheduler array 121 initiates a new wavefront arbitration for a future frame time T. In order to begin the arbitration, of course, the input and output free information for T must arrive by R, as discussed above. To schedule a multicast request for an ingress port 102A, the X-SCH chip 120 first determines whether the ingress port 102A is free to send a cell to crossbar 104 at T. If ingress port 102A is not free, no further progress can be made and the particular request remains slotted in MT buffer 156. If ingress port 102A is available, the scheduler chip 120 examines the entry at the head 158 of MT circular buffer 156 for that ingress port 102A. The X-SCH chip 120 attempts, when possible, to process requests in FIFO order, starting with the request at the head 158 of MT 156. A X-SCH chip 120 will not choose to initiate a grant out-of-order, even between flows. However, if an upstream neighbor X-SCH chip of a first X-SCH chip sends out of order a grant for a request slotted in the first X-SCH chip, then the first X-SCH chip will also attempt to grant to the same request.

Arbitration begins, for any row, with the lead X-SCH chip; this is the X-SCH chip that appears in the first diagonal of the wavefront. The lead X-SCH chip considers the request at the head 158 of its MT 156 and determines whether any of the output ports 102B specified by the request are available. If one or more output ports 102B are available, the scheduler chip 120 initiates a new grant. This involves marking the input port 102A as no longer free for the remainder of the arbitration for T and passing on the free information to subsequent scheduler chips 120 in the row. The scheduler chip 120 also marks the scheduled output ports 102B as no longer free for arbitration of T and passes this information to subsequent scheduler chips 120 in the column. Next, the scheduler chip 120 generates and passes a reverse routing tag for each scheduled output port 102B for use at T so that the reverse-routing tag can be sent to the X-PP 114 that will receive the cell. Finally, at step 160, the scheduler chip 120 passes the MTI of the scheduled cell along the row so that each scheduler chip 120 knows which particular cell has been scheduled. If no output ports 102B were available, then no grant is made, and the next scheduler 120 in the row gets to start the decision process from the beginning (as if it were the lead), since the previous scheduler 120 made no binding decision to be followed.

If, during an arbitration for T, a downstream scheduler S learns that an upstream scheduler has already granted the input port 102A to a particular multicast cell C (as identified by the MTI of C), then the downstream scheduler may only grant the fanout associated with C; i.e. the downstream scheduler can only schedule additional portions of the request that have already been scheduled upstream. If the portion of C's fanout that is relevant to S is empty, or C has already been dequeued within S, then S cannot schedule anything, and passes the arbitration (including the earlier decision about granting C) to the next scheduler in the chain. If C's fanout is not empty, then S can grant C's fanout if, but only if, such grant would not result in mis-sequencing C within its flow. In order to evaluate the likelihood of such mis-sequencing, S must determine whether any flow dependencies exist for C by using the DD value computed in X-FIT 122 (and stored along with the fanout in the X-SCH's Multicast Table). Accordingly, S checks to see if the sum of MTI of C and DD exceeds the MTI value of the head entry 158 of S's Multicast Table 156, then all prior cells in the same flow as C have already been scheduled within S. Accordingly, C does not depend on any other request within scheduler S, and S is free to schedule output ports 102B for C, regardless of whether C is the head-of-line or not; this is why cells in different flows can arrive out-of-order at an output. If, on the other hand, the sum of MTI of C and DD does not exceed the MTI value of the head entry 158 of S's Multicast Table 156, then some older request within the flow has yet to be scheduled and no output ports 102B of C may be scheduled by S.

In the next phase of scheduling frame time T, the input grants and input free information are passed along the rows of array 121, and reverse-routing tags and output free information are passed down the columns to the leading diagonal of the array 121. From there, such grants, tags and information are transmitted back to X-PP 200. As with unicast scheduling, the scheduler subsystem 106 and X-PP 114 must be in sync and have a mutual understanding that the returning information is for time T.

The final phase of scheduling, the check for a dequeue, is essentially a bookkeeping operation. When an arbitration cycle is complete and an MTI has been granted, one more loop around each of the schedulers 120 within the row is made to check whether every scheduler 120 has processed that MTI. If that MTI has been so-processed, then the scheduler 120 on the leading diagonal sends a message to X-PP 200 indicating that X-PP 200 may free the entry in its Multicast Table 140, thereby allowing a new request to enter the scheduling window. In order to avoid sending the MTI bits with the dequeue, it is understood that a dequeue signal will arrive a known number of frame times after a grant (which explicitly carries the MTI).

When scheduler subsystem 106 returns a grant to X-PP 200 for a multicast cell, the grant information, including the priority, is accompanied by the MTI. The grant is for a crossbar reservation a constant, and therefore implied, number of frame times D in the future.

After the final grant of a cell, its associated fanout has been completely scheduled, and the scheduler subsystem 106 sends a dequeue command to X-PP 200. This command instructs X-PP 200 to release the MT entry occupied by the scheduled cell, returning it to the pool of available entries in the multicast request window. When a cell is scheduled, scheduler subsystem 106 delivers a reverse routing tag to each destination switch port 102B. This is an 8-bit value (to cover each of the possible 256 ingress switch ports 102A) that egress port 102B must submit to crossbar 104. This tag must be buffered for the same D frame times as the grant.

Although the invention has been described in terms of the illustrative embodiment, it will be appreciated by those skilled in the art that various changes and modifications may be made to the illustrative embodiment without departing from the spirit or scope of the invention. It is intended that the scope of the invention not be limited in any way to the illustrative embodiment shown and described but that the invention be limited only by the claims appended hereto.

What is claimed is:

1. A method of facilitating the scheduling of a first multicast request signal of a series of multicast request signals, the first request signal being generated to enable the transmission of a multicast data cell by a source port processor to at least one destination port processor, the method comprising:
   determining a dependence distance associated with the first request signal;
   determining a first multicast table index comprising a numerical value;
   determining a second multicast table index comprising a numerical value;
   determining a first numerical parameter, said first numerical parameter comprising the numerical sum of said dependence distance and said first multicast table index; and
   if said first numerical parameter is higher in value than said second multicast table index, arbitrating the first request signal.

2. The method of claim 1, further comprising detaining the first request signal in a first queue associated with the source port processor.

3. The method of claim 1, further comprising transmitting the first request signal to a first circular buffer associated with the source port processor, said transmission causing the first request signal to occupy a first tail entry slot of the first circular buffer.

4. The method of claim 1, further comprising transmitting the first request signal to a roster storage chip associated with a scheduler subsystem.

5. The method of claim 4, wherein the first request signal is adapted to schedule transmission of the first multicast cell to the at least one destination port processor at a first time.

6. The method of claim 5, wherein the first request signal has associated therewith a multicast label of a first value.

7. The method of claim 5, wherein a first free signal is transmitted simultaneously with the first request signal to said roster storage chip associated with said scheduler subsystem.

8. The method of claim 7, wherein said first free signal indicates the availability of the source port processor to transmit the first multicast cell at said first time.

9. The method of claim 8, wherein said first free signal further indicates the availability of the source port processor to receive a second multicast cell at said first time.

10. The method of claim 1, further comprising generating a roster of the at least one destination port processor to which the first multicast cell is destined.

11. The method of claim 1, wherein said dependence distance comprises a numerical value of the difference between a current multicast cell number and a previous multicast cell number.

12. The method of claim 11, wherein said current multicast cell number comprises the numerical value returned by a counter responsive to the source port processor.

13. The method of claim 12, wherein said counter is incremented each time a request signal of the series of request signals transmitted by the source port processor is further transmitted by a roster storage chip to at least one scheduler chip associated with a scheduler subsystem.

14. The method of claim 11, wherein said previous multicast cell number comprises the current multicast cell number value returned in the immediately previous instance in which a request signal of the series of request signals bearing a multicast label of a first value was received by a roster storage chip.

15. The method of claim 1, further comprising transmitting said dependence distance to one of at least one scheduler chip.

16. The method of claim 15, wherein said transmission causes said dependence distance to occupy a second tail entry slot of a second circular buffer associated with said one of said at least one scheduler chip.

17. The method of claim 16, wherein said second tail entry slot has associated therewith said first multicast table index.

18. The method of claim 15, wherein said scheduler chip has associated therewith a head entry slot having associated therewith said second multicast table index.

19. The method of claim 1, further comprising transmitting a first free signal to one of at least one scheduler chip, said first free signal indicating the availability of the source port processor to transmit the first multicast cell at a first time, said first free signal further indicating the availability of the source port processor to receive a second multicast cell at said first time.

20. The method of claim 1, further comprising transmitting a roster to one of at least one scheduler chip, said roster describing the at least one destination port processor to which the first multicast cell is destined.

21. The method of claim 20, wherein said transmission causes said roster to occupy a second tail entry slot of a second circular buffer associated with said one of said at least one scheduler chip.

22. A method of facilitating the scheduling of a first multicast request signal of a series of multicast request signals, the first request signal being generated to enable the transmission of a multicast data cell by a source port processor to at least one destination port processor, the method comprising:

detaining the first request signal in a first queue associated with the source port processor;

transmitting the first request signal to a first circular buffer associated with the source port processor, said transmission causing the first request signal to occupy a first tail entry slot of the first circular buffer;

transmitting simultaneously to a roster storage chip associated with a scheduler subsystem:

(i) the first request signal, the first request signal being adapted to schedule transmission of the first multicast cell to the at least one destination port processor at a first time, the first request signal having associated therewith a multicast label of a first value, and         (ii) a first free signal indicating the availability of the source port processor to transmit the first multicast cell at said first time, said first free signal further indicating the availability of the source port processor to receive a second multicast cell at said first time;

generating a roster of the at least one destination port processor to which the first multicast cell is destined;

determining a dependence distance associated with the first request signal, said dependence distance comprising a numerical value of the difference between a current multicast cell number and a previous multicast cell number, said current multicast cell number comprising the numerical value returned by a counter responsive to the source port processor, said counter being incremented each time a request signal of the series of request signals transmitted by the source port processor is further transmitted by said roster storage chip to at least one scheduler chip associated with said scheduler subsystem, said previous multicast cell number comprising the current multicast cell number value returned in the immediately previous instance in which a request signal of the series of request signals bearing a multicast label of said first value was received by said roster storage chip;

transmitting said first free signal, said roster and said dependence distance to one of said at least one scheduler chip, said transmission causing said roster and said dependence distance to occupy a second tail entry slot of a second circular buffer associated with said one of said at least one scheduler chip, said second tail entry slot having associated therewith a first multicast table index comprising a numerical value, said scheduler chip further having associated therewith a head entry slot having associated therewith a second multicast table index comprising a numerical value;

determining a first numerical parameter, said first numerical parameter comprising the numerical sum of said dependence distance and said first multicast table index; and     if said first numerical parameter is higher in value than said second multicast table index, arbitrating the first request signal.

23. A system for facilitating the scheduling of a first multicast request signal of a series of multicast request signals, the first request signal being generated to enable the transmission of a multicast data cell by a source port processor to at least one destination port processor, the system comprising:

a scheduler subsystem in communication with the source port processor, said scheduler subsystem comprising at least one scheduler chip, said scheduler subsystem further comprising a roster storage chip, said roster storage chip further adapted to determine a dependence distance associated with the first request signal, said at least one scheduler chip adapted to produce a first multicast table index comprising a numerical value, said at least one scheduler chip adapted to produce a second multicast table index comprising a numerical value, said scheduler chip further adapted to determine a first numerical parameter, said first numerical parameter comprising the numerical sum of said dependence distance and said first multicast table index, said scheduler chip further adapted to arbitrate the first request signal if said first numerical parameter is higher in value than said second multicast table index.

24. The system of claim 23, further comprising a first queue associated with the source port processor, said first queue adapted to detain the first request signal.

25. The system of claim 23, further comprising a first circular buffer associated with the source port processor, said first circular buffer comprising a first tail entry slot, said first circular buffer adapted to receive the first request signal, said receiving causing the first request signal to occupy said first tail entry slot.

26. The system of claim 23, wherein said roster storage chip is adapted to generate a roster of the at least one destination port processor to which the first multicast cell is destined.

27. The system of claim 23, wherein said roster storage chip is adapted to receive the first request signal, the first request signal being adapted to schedule transmission of the first multicast cell to the at least one destination port processor at a first time.

28. The system of claim 27, wherein the first request signal has associated therewith a multicast label of a first value.

29. The system of claim 27, wherein said roster storage chip is adapted to receive a first free signal indicating the availability of the source port processor to transmit the first multicast cell at said first time.

30. The system of claim 29, wherein said first free signal further indicates the availability of the source port processor to receive a second multicast cell at said first time.

31. The system of claim 23, wherein said dependence distance comprises a numerical value of the difference between a current multicast cell number and a previous multicast cell number.

32. The system of claim 31, wherein said current multicast cell number comprises the numerical value returned by a counter responsive to the source port processor.

33. The system of claim 32, wherein said counter is incremented each time a request signal of the series of request signals transmitted by the source port processor is further transmitted by said roster storage chip to said at least one scheduler chip.

34. The system of claim 31, wherein said previous multicast cell number comprises the current multicast cell number value returned in the immediately previous instance in which a request signal of the series of request signals bearing a multicast label of a first value associated with the first request signal was received by said roster storage chip.

35. A system for facilitating the scheduling of a first multicast request signal of a series of multicast request signals, the first request signal being generated to enable the transmission of a multicast data cell by a source port processor to at least one destination port processor, the system comprising:

a first queue associated with the source port processor, said first queue adapted to detain the first request signal;

a first circular buffer associated with the source port processor, said first circular buffer comprising a first tail entry slot, said first circular buffer adapted to receive the first request signal, said receiving causing the first request signal to occupy said first tail entry slot; and a scheduler subsystem in communication with said first circular buffer, said scheduler subsystem comprising at least one scheduler chip, said at least one scheduler chip comprising a second circular buffer, said scheduler subsystem further comprising a roster storage chip, said roster storage chip adapted to generate a roster of the at least one destination port processor to which the first multicast cell is destined, said roster storage chip further adapted to simultaneously receive:

(i) the first request signal, the first request signal being adapted to schedule transmission of the first multicast cell to the at least one destination port processor at a first time, the first request signal having associated therewith a multicast label of a first value, and (ii) a first free signal indicating the availability of the source port processor to transmit the first multicast cell at said first time, said first free signal further indicating the availability of the source port processor to receive a second multicast cell at said first time; said roster storage chip further adapted to determine a dependence distance associated with the first request signal, said dependence distance comprising a numerical value of the difference between a current multicast cell number and a previous multicast cell number, said current multicast cell number comprising the numerical value returned by a counter responsive to the source port processor, said counter being incremented each time a request signal of the series of request signals transmitted by the source port processor is further transmitted by said roster storage chip to said at least one scheduler chip, said previous multicast cell number comprising the current multicast cell number value returned in the immediately previous instance in which a request signal of the series of request signals bearing a multicast label of said first value was received by said roster storage chip, said at least one scheduler chip adapted to receive said first free signal, said roster and said dependence distance, said receiving causing said roster and said dependence distance to occupy a second tail entry slot of said second circular buffer, said second tail entry slot having associated therewith a first multicast table index comprising a numerical value, said scheduler chip further having associated therewith a head entry slot having associated therewith a second multicast table index comprising a numerical value, said scheduler chip further adapted to determine a first numerical parameter, said first numerical parameter comprising the numerical sum of said dependence distance and said first multicast table index, said scheduler chip further adapted to arbitrate the first request signal if said first numerical parameter is higher in value than said second multicast table index.

36. A system for facilitating the scheduling of a first multicast request signal of a series of multicast request signals, the first request signal being generated to enable the transmission of a multicast data cell by a source port processor to at least one destination port processor, the system comprising:

a scheduler subsystem in communication with the source port processor, said scheduler subsystem comprising at least one means for scheduling, said scheduler subsystem further comprising a means for roster storage, said roster storage means further adapted to determine a dependence distance associated with the first request signal, said scheduling means adapted to produce a first multicast table index comprising a numerical value, said scheduling means adapted to produce a second multicast table index comprising a numerical value, said scheduling means further adapted to determine a first numerical parameter, said first numerical parameter comprising the numerical sum of said dependence distance and said first multicast table index, said scheduling means further adapted to arbitrate the first request signal if said first numerical parameter is higher in value than said second multicast table index.

* * * * *